US012314538B2

(12) United States Patent
Calleja et al.

(10) Patent No.: US 12,314,538 B2
(45) Date of Patent: May 27, 2025

(54) INTERACTIVE HEATMAPS FOR WEBSITES

(71) Applicant: Hotjar Ltd, Paceville St Julian's (MT)

(72) Inventors: Clint Calleja, Paris (FR); Jacob Holloway, Barcelona (ES); Luke Camilleri, Paris (FR); Stephanie Mifsud, Paris (FR); Erik Näslund, Paris (FR); Katerina Asimoglou, Ptolemaida (GR); Abdulrahman Assabri, Cairo (EG); Adam Mortka, Paris (FR); David Berliner, Cape Town (ZA)

(73) Assignee: Hotjar Ltd, Paceville St Julian's (MT)

( * ) Notice: Subject to any disclaimer, the term of this patent is extended or adjusted under 35 U.S.C. 154(b) by 0 days.

(21) Appl. No.: 18/384,656

(22) Filed: Oct. 27, 2023

(65) Prior Publication Data

US 2024/0143137 A1 May 2, 2024

Related U.S. Application Data

(60) Provisional application No. 63/419,981, filed on Oct. 27, 2022.

(51) Int. Cl.
*G06F 3/04842* (2022.01)
*G06F 3/0483* (2013.01)
*G06F 9/451* (2018.01)
*G06T 11/20* (2006.01)

(52) U.S. Cl.
CPC ........ *G06F 3/0483* (2013.01); *G06F 3/04842* (2013.01); *G06F 9/451* (2018.02); *G06T 11/206* (2013.01); *G06F 2203/04804* (2013.01); *G06T 2200/24* (2013.01); *G06T 2210/62* (2013.01)

(58) Field of Classification Search
CPC ........... G06F 9/451; G06F 2203/04804; G06T 11/206; G06T 2200/24; G06T 2210/62
See application file for complete search history.

(56) References Cited

U.S. PATENT DOCUMENTS

| 10,831,512 | B2 | 11/2020 | Walker et al. | |
| 11,790,031 | B1 | 10/2023 | Baatout et al. | |
| 2008/0046562 | A1* | 2/2008 | Butler | G06F 16/958 709/224 |
| 2010/0251128 | A1* | 9/2010 | Cordasco | G06F 11/328 715/736 |

(Continued)

OTHER PUBLICATIONS

Kawaljit Kaur et al., Click Analytics: What clicks on webpage indicates?, Oct. 1, 2016, International Conference on Next Generation Computing Technologies, pp. 1-7 (Year: 2016).*

(Continued)

*Primary Examiner* — Tam T Tran
(74) *Attorney, Agent, or Firm* — Schwegman Lundberg Woessner, P.A.

(57) ABSTRACT

Techniques for generating heatmap overlays, for presentation with interactive web pages of websites are described. Consistent with embodiments, client-side scripting is used to obtain heatmap data (derived from website usage data) from a data analytics service, and generate from the heatmap data an overlay showing a heatmap. The heatmap includes heatmap blobs positioned and colored to indicate the web page elements that have been clicked most frequently.

20 Claims, 11 Drawing Sheets

(56) References Cited

U.S. PATENT DOCUMENTS

2020/0327031 A1* 10/2020 Oh ............... G06F 11/3438
2021/0240924 A1* 8/2021 Siroker ............ G06F 9/451

OTHER PUBLICATIONS

Jorge Poco et al., Extracting and Retargeting Color Mappings from Bitmap Images of Visualizations, Jan. 1, 2018, IEEE Transactions on Visualization and Computer Graphics, vol. 24, No. 1, pp. 637-646 (Year: 2018).*

Daisuke Mashima et al., Visualizing Dynamic Data with Maps, Jun. 12, 2012, IEEE Transactions on Visualization and Computer Graphics, vol. 18, No. 9, pp. 1424-1437 (Year: 2012).*

Guodao Sun et., Embedding Temporal Display into Maps for Occlusion-Free Visualization of Spatio-Temporal Data, Mar. 1, 2014, IEEE Pacific Visualization Symposium, pp. 185-192 (Year: 2014).*

Iryna Zhuravska et al., Heatmaps for Catering Establishments Web-Applications Available via MAS-Improved Wireless Networks, Sep. 17, 2020, International Symposium on Smart and Wireless Systems, pp. 1-6 (Year: 2020).*

Ross Maciejewski et al., A Visual Analytics Approach to Understanding Spatiotemporal Hotspots, Feb. 9, 2010, Transactions on Visualization and Computer Graphics, vol. 16, No. 2, pp. 205-220 (Year: 2010).*

Steven R. Gomez et al., Fauxvea: Crowdsourcing Gaze Location Estimates for Visualization Analysis Tasks, Jan. 27, 2017, IEEE Transactions on Visualization and Computer Graphics, vol. 23, No. 2, pp. 1042-1055 (Year: 2017).*

DongHwa Shin et al., RCMVis: A Visual Analyticsw System for Route Choice Modeling, Dec. 1, 2021, vol. 29, No. 3, pp. 1799-1817 (Year: 2021).*

* cited by examiner

INTERACTIVE HEATMAPS FOR WEBSITES

RELATED APPLICATIONS

The present application claims the benefit of priority to Greece Patent Application Serial Number 2418-0004779925, filed Oct. 27, 2023, which claims the benefit of priority under 35 U.S.C. § 119(e) to prior-filed United States provisional application No. 63/419,981, filed on Oct. 27, 2022, each which is incorporated herein by reference in its entirety.

TECHNICAL FIELD

The present application generally relates to a web-based analytics service for generating data-driven visualizations (e.g., heatmaps) that allow a data analyst to view end-user behavior as it relates to interactions (e.g., clicks, taps, cursor movements, and page scrolls) with web pages of websites. More specifically, the present application describes a technique for generating and displaying dynamic heatmaps that overlay a live view of a web page.

BACKGROUND

When it comes to websites, determining how well a website performs and whether or not a website is successful depends significantly upon the nature and content of the website, and its intended audience. By way of example, some websites may be advertisement-supported, and in such instances, success may be measured with one or more of several different engagement metrics. Some of the many metrics that may be used to assess website performance and generally gauge success include: overall traffic, unique visitors, bounce rate, average time on site, and average page views per visit. With other websites, including those that may be associated with or offering a subscription-based service, e-commerce websites, and others, performance may best be determined with a metric relating to conversions. Here, a conversion may include an end-user concluding a purchase transaction for a product or service, registering or signing up with a website, or simply clicking a button to initiate a chat session, among others. These are just a few of the many examples of how the performance, and ultimately the success, of a website may be measured.

The design of a website, including individual web pages, can have a seriously profound impact on the performance and success of the website. One aspect of design that is particularly important is that component of design that relates to how users experience the website. For instance, the user experience is heavily impacted by the appearance, layout, and, in some cases, the content of a website, and the individual web pages. The layout refers to how information is structured and categorized, and how and where various visual elements are positioned within any given web page. Even the color of the web page can have an impact on performance. Generally, a good web design is easy to use, aesthetically pleasing, and suits the target audience and brand of the website. Therefore, there is a need for tools that help web designers understand how a website design is impacting performance.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for generating dynamic heatmaps for presentation, via a web browser, as an overlay of a live view of a web page, such that the heatmap provides a visual representation of the web page elements that end-users (e.g., viewers) of the web page have interacted with most frequently. It will be evident, however, to one skilled in the art, that the present invention may be practiced and/or implemented with varying combinations of the many details and features presented herein.

With some software-based tools for website analytics, heatmaps are used to visually convey how end-users (e.g., viewers) of a web page interact with the various visual elements of the web page. In this context, a heatmap is a data visualization technique that shows the magnitude of some specific end-user behavior as color in two dimensions. For example, the end-user behavior may include clicks or taps of specific user interface elements (e.g., links, buttons, drop down menus, and so forth) that are present in a web page, as rendered by a web browser application. The variation in color within the heatmap may be by hue or intensity, giving obvious visual cues to the viewer about how the specific end-user behavior is clustered or varies over the two dimensions of the web page. By generating a heatmap for a web page, a data analyst can quickly identify content items that are actively engaged by end-users, and content items that are perhaps being overlooked by end-users. An example of a click heatmap overlaying a static image of a web page 100 is shown in FIG. 1.

Figure 1:
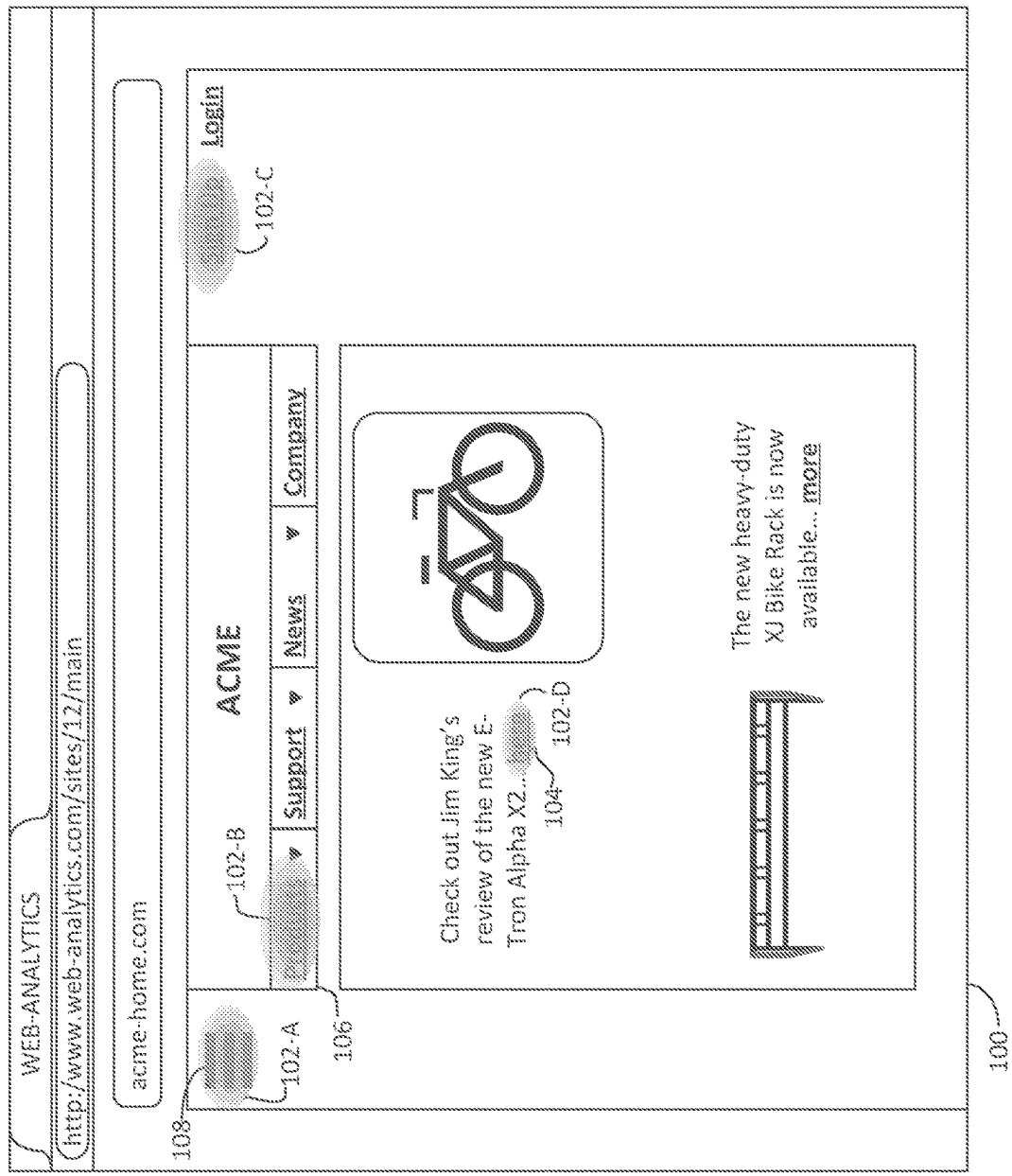
FIG. 1 is a diagram illustrating a web page with a heatmap overlay that is being presented over a static image (e.g., a screenshot) of a target web page.

In the example of FIG. 1, the click heatmap is transparent in those places or positions where no end-user clicks were previously detected, and various semi-transparent heatmap "blobs" (102-A, 102-B, 102-C, and 102-D) are shown overlaying those locations of the static image of the web page 100 where end-user clicks were detected. For purposes of the present application, a heatmap blob—sometimes referred to simply as "the heat"—is the visual portion of a spatial heatmap that is generally shown with varying colors (e.g., a color range) where each color represents a level of end-user activity (e.g., clicks for a click heatmap). Here, and for purposes of the present application, the heatmap blobs (102-A, 102-B, 102-C and 102-D) are shown in variations of the color, grey. However, it will be appreciated that in actual implementation, both the web page and the heatmap may have varying colors, where the intensity or hue represents a level of detected end-user activity in the location of a heatmap blob.

In the example presented in FIG. 1, the heatmap blobs identify locations on the web page where there was a significant number of end-user clicks. For instance, in this example, the intensity or color of the semi-transparent heatmap blob 102-C indicates that end-users frequently selected or clicked the link or button labeled as "Sign Up." Similarly, the heatmap blob 102-A presented in connection with the hamburger style menu icon or button 108 indicates that end-users tend to select or click that element.

As illustrated in FIG. 1, one of the drawbacks with conventional web-based heatmap tools is that the heatmap overlays a static image 100 (e.g., a screenshot or screen grab) of the web page. Accordingly, the static image 100, like a snapshot, represents the visual appearance of the web page at a specific point in time. This is problematic for several reasons. First, as a data analyst is viewing the image of the web page and corresponding heatmap, the data analyst cannot select interactive elements of the web page to navigate to other web pages of the website efficiently and quickly. This, in turn, makes it difficult to easily "trace" or repeat the end-user behavior that is reflected in the heatmap. For instance, if the coloring of the heatmap blob 102-D indicates that it is far and away the most frequently selected (e.g., clicked) element of the web page, when a data analyst is viewing the web page image 100 with the heatmap, the data analyst will naturally want to understand why end-users are clicking the underlying link (e.g., "here" 104). However, because the web page is represented as a static image, the link is of course not active, and selecting it will not result in the web browser requesting a new web page that corresponds with the link.

A second and related problem involves dynamic content of a web page, such as menus, drop-downs, modals, pop-up windows, content carousels, and slideshows, to name a few examples. As shown in FIG. 1, several content elements of the web page from which the web page image 100 was captured are dynamic in nature. For example, the user interface element 106 labeled as "Products" is a dynamic control element that, when selected (e.g., clicked) by an end-user, displays a drop-down menu of additional content items that can be selected. As shown by the heatmap blob 102-B, the user interface element 106 is frequently clicked by end-users. However, because the heatmap is presented over a static image of a web page 100, the dynamic content that is displayed when an end-user selects the "Products" button 106 is not shown. This problem is sometimes solved by maintaining multiple static images of a web page, with each image representing a different state of visible content items. However, this solution is not ideal as it forces the data analyst to maintain many different images of the same web page, and the interface by which the data analyst switches from one image to the next is clunky at best. These and other problems are addressed by embodiments of the present invention as described below.

Consistent with embodiments of the present invention, a web-based analytics service collects website usage data (e.g., clicks, taps, cursor movements, and page scrolls) as end-users interact with various elements of various web pages of a website. The website usage data is then aggregated and used to generate a dynamic heatmap that is presented as an overlay, above a "live view" or "interactive view" of the corresponding web page of a website. Here, the terms "live view" and "interactive view" are being used synonymously to indicate that the web page over which the heatmap is presented is an actual interactive rendering of the web page, and not an image of a web page. With some embodiments, the interactive web page may be embedded (e.g., within an HTML container object), while in other embodiments, URL query parameters may be passed to a client-side script, such that the heatmap can be generated as an overlay of the original website—a concept referred to herein as an "on-site" heatmap. In either scenario, a data analyst who is viewing the web page and heatmap can easily interact with the web page, for example, by clicking on links, buttons, and so forth. Consistent with embodiments of the present invention, when an end-user interacts with the interactive view of the target web page, any time the Uniform Resource Locator ("URL") of the web page being presented changes, the heatmap overlaying the webpage is updated to reflect the website usage data that corresponds with the new URL Consistent with some embodiments of the present invention, the web page for which website usage data has been collected and over which the semi-transparent heatmap is overlayed is presented within another web page, an embedded web page. Accordingly, for purposes of describing some embodiments of the present invention, to distinguish the two web pages, the web page associated with the website usage data and relevant to the heatmap will be referred to as the embedded web page or target web page, whereas the web page in which the target web page is embedded will be referred to simply as the analytics web page. Of course, in other embodiments, the heatmap may be generated client-side to overlay directly over a web page, for example, without being embedded within another web page—a concept referred to as an on-site heatmap.

Consistent with some embodiments, using client-side scripting (e.g., JavaScript), the target web page implements event handlers to detect end-user interactions with the target web page, where the interactions may include scrolling, resizing, and mouse move events. A mutation observer, also implemented with a client-side scripting language, is used to detect when visible elements are added or removed from the target web page. Accordingly, when various changes occur to the visual presentation of the target web page, events are detected, thereby triggering updates to the presentation of the heatmap, allowing the heatmap to be dynamically generated with heatmap blobs corresponding only with those elements that are actually visible to the end-user on the web page. By way of example, if a drop-down menu is currently visible, and as a result, one or more web page elements that are behind the drop-down menu become temporarily hidden or invisible, any heatmap blob that is associated with one of the hidden or invisible web page elements will not be generated as part of the dynamic heatmap presented as an overlay, while the drop-down menu remains visible. When the drop-down menu becomes inactive or invisible, for example, as a result of the end-user moving a mouse-controlled cursor, the heatmap will automatically and dynamically be updated to exclude any heatmap blobs associated with elements of the drop-down menu and include an web page elements that have once again become visible, as a result of the menu being hidden. Other advantages and aspects of the present invention will become readily apparent from the description of the several figures that follows.

Figure 2:
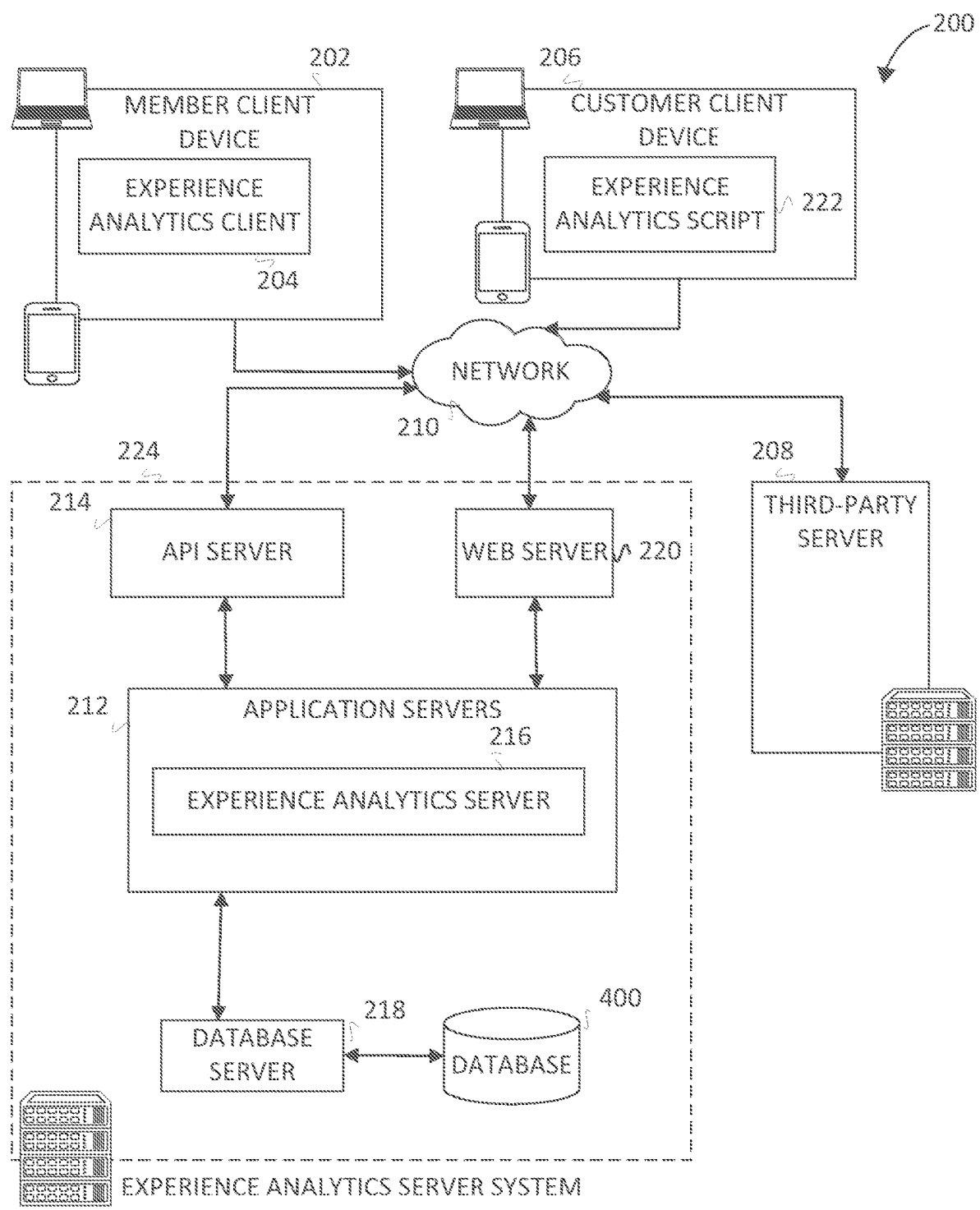
FIG. 2 is a diagrammatic representation of a networked environment in which example embodiments may be deployed, in accordance with some examples.

FIG. 2 is a block diagram showing an example experience analytics system 200 that analyzes and quantifies the user experience of users navigating a client's website, mobile websites, and applications. The experience analytics system 200 can include multiple instances of a member client device 202, multiple instances of a customer client device 206, and multiple instances of a third-party server 208.

The member client device 202 is associated with a client of the experience analytics system 200, where the client that has a website hosted on the client's third-party server 208. For example, the client can be a retail store that has an online retail website that is hosted on a third-party server 208. An agent of the client (e.g., a web master, an employee, etc.) can be the user of the member client device 202.

Each of the member client devices 202 hosts a number of applications, including an experience analytics client 204. Each experience analytics client 204 is communicatively coupled with an experience analytics server system 224 and third-party servers 208 via a network 210 (e.g., the Internet). An experience analytics client 204 can also communicate with locally-hosted applications using Applications Program Interfaces (APIs).

The member client devices 202 and the customer client devices 206 can also host a number of applications including Internet browsing applications (e.g., Chrome. Safari, etc.). The experience analytics client 204 can also be implemented as a platform that is accessed by the member client device 202 via an Internet browsing application or implemented as an extension on the Internet browsing application.

Users of the customer client device 206 can access client's websites that are hosted on the third-party servers 208 via the network 210 using the Internet browsing applications. For example, the users of the customer client device 106 can navigate to a client's online retail website to purchase goods or services from the website. While the user of the customer client device 206 is navigating the client's website on an Internet browsing application, the Internet browsing application on the customer client device 206 can also execute a client-side script (e.g., JavaScript (.*js)) such as an experience analytics script 222. In one example, the experience analytics script 222 is hosted on the third-party server 108 with the client's website and processed by the Internet browsing application on the customer client device 206. The experience analytics script 222 can incorporate a scripting language (e.g., a .*js file or a .json file).

In certain examples, a client's native application (e.g. ANDROID® or IOS® Application) is downloaded on the customer client device 206. In this example, the client's native application including the experience analytics script 222 is programmed in JavaScript leveraging a Software Development Kit (SDK) provided by the experience analytics server system 224. The SDK includes Application Programming Interfaces (APIs) with functions that can be called or invoked by the client's native application.

In one example, the experience analytics script 222 records data including the changes in the interface of the website being displayed on the customer client device 206, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 222 transmits the data to experience analytics server system 224 via the network 210. In another example, the experience analytics script 222 transmits the data to the third-party server 108 and the data can be transmitted from the third-party server 108 to the experience analytics server system 224 via the network 210.

An experience analytics client 204 is able to communicate and exchange data with the experience analytics server system 224 via the network 110. The data exchanged between the experience analytics client 204 and the experience analytics server system 224, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 224 supports various services and operations that are provided to the experience analytics client 204. Such operations include transmitting data to and receiving data from the experience analytics client 204. Data exchanges to and from the experience analytics server system 224 are invoked and controlled through functions available via user interfaces (UIs) of the experience analytics client 204.

The experience analytics server system 224 provides server-side functionality via the network 210 to a particular experience analytics client 204. While certain functions of the experience analytics system 200 are described herein as being performed by either an experience analytics client 204 or by the experience analytics server system 224, the location of certain functionality either within the experience analytics client 104 or the experience analytics server system 224 may be a design choice. For example, it may be technically preferable to initially deploy certain technology and functionality within the experience analytics server system 224 but to later migrate this technology and functionality to the experience analytics client 204 where a member client device 202 has sufficient processing capacity.

Turning now specifically to the experience analytics server system 224, an Application Program Interface (API) server 214 is coupled to, and provides a programmatic interface to, application servers 212. The application servers 212 are communicatively coupled to a database server 218, which facilitates access to a database 400 that stores data associated with experience analytics processed by the application servers 212. Similarly, a web server 220 is coupled to the application servers 212, and provides web-based interfaces to the application servers 212. To this end, the web server 220 processes incoming network requests over the Hypertext Transfer Protocol (HTTP) and several other related protocols.

The Application Program Interface (API) server 214 receives and transmits message data (e.g., commands and message payloads) between the member client device 202 and the application servers 212. Specifically, the Application Program Interface (API) server 214 provides a set of interfaces (e.g., routines and protocols) that can be called or queried by the experience analytics client 204 or the experience analytics script 222 in order to invoke functionality of the application servers 212. The Application Program Interface (API) server 214 exposes to the experience analytics client 204 various functions supported by the application servers 212, including generating information on errors, insights, merchandising information, adaptability information, images, graphs providing visualizations of experience analytics, session replay videos, zoning and overlays to be applied on the website, etc.

The application servers 212 host a number of server applications and subsystems, including for example an experience analytics server 216. The experience analytics server 216 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 222 on customer client devices 106. The experience analytics server 216 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 216, in view of the hardware requirements for such processing.

System Architecture

Figure 3:
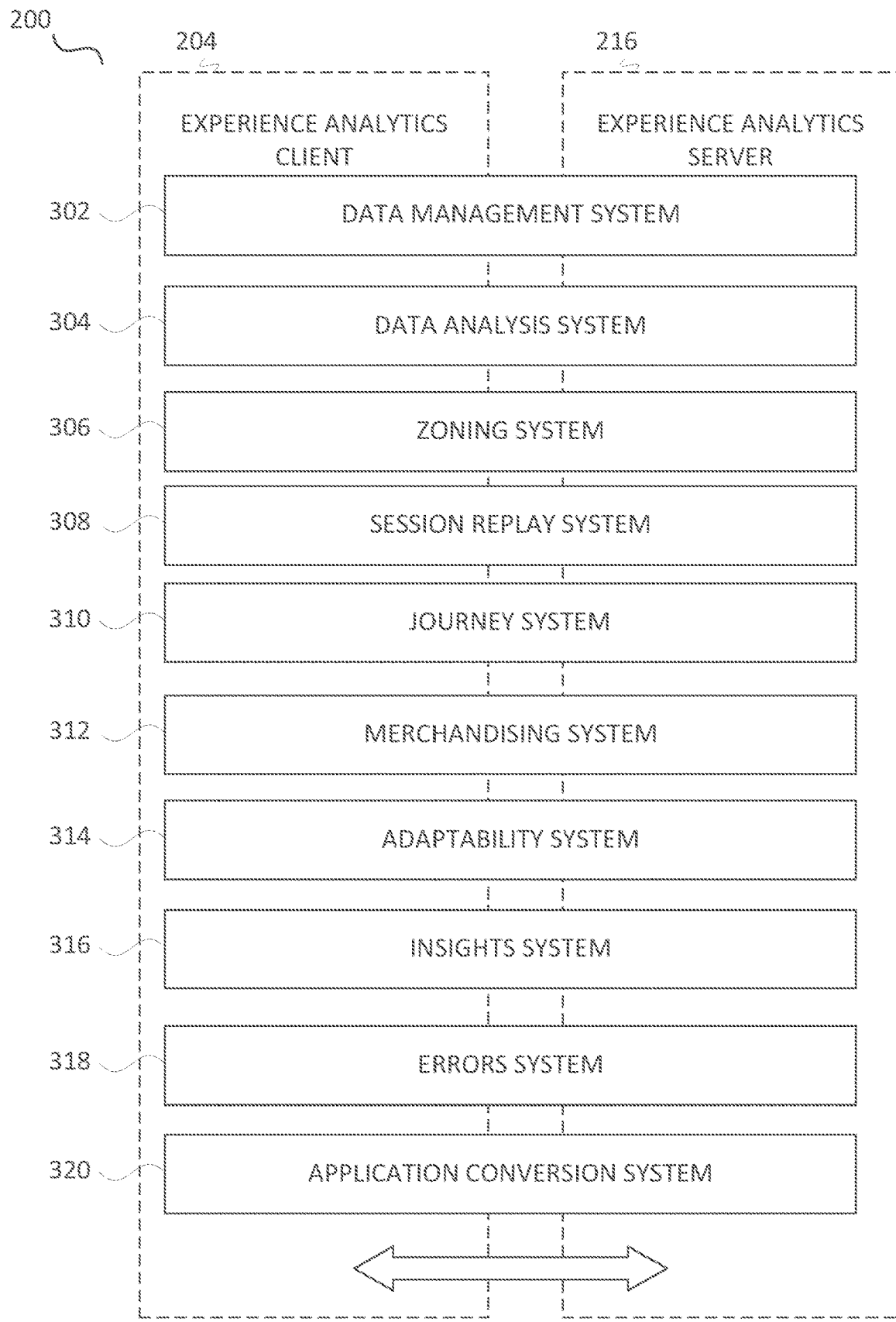
FIG. 3 is a diagrammatic representation of an experience analytics system, in accordance with some examples, that has both client-side and server-side functionality.

FIG. 3 is a block diagram illustrating further details regarding the experience analytics system 200 according to some examples. Specifically, the experience analytics system 200 is shown to comprise the experience analytics client 204 and the experience analytics server 216. The experience analytics system 200 embodies a number of subsystems, which are supported on the client-side by the experience analytics client 204 and on the server-side by the experience analytics server 216. These subsystems include, for example, a data management system 302, a data analysis system 304, a zoning system 306, a session replay system 308, a journey system 310, a merchandising system 312, an adaptability system 314, an insights system 316, an errors system 318, and an application conversion system 320.

The data management system 302 is responsible for receiving functions or data from the member client devices 202, the experience analytics script 222 executed by each of the customer client devices 206, and the third-party servers 208. The data management system 302 is also responsible for exporting data to the member client devices 202 or the third-party servers 208 or between the systems in the experience analytics system 200. The data management system 302 is also configured to manage the third-party integration of the functionalities of experience analytics system 200.

The data analysis system 304 is responsible for analyzing the data received by the data management system 302, generating data tags, performing data science and data engineering processes on the data.

The zoning system 306 is responsible for generating a zoning interface to be displayed by the member client device 202 via the experience analytics client 204. The zoning interface provides a visualization of how the users via the customer client devices 206 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 306 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 308 is responsible for generating the session replay interface to be displayed by the member client device 202 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 206 can be reconstructed from the data received from the user's experience analytics script 222 on customer client devices 206. The session replay interface can also include the session replays of a number of different visitor sessions to the client's website within a period of time (e.g., a week, a month, a quarter, etc.). The session replay interface allows the client via the member client device 202 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 310 is responsible for generating the journey interface to be displayed by the member client device 202 via the experience analytics client 204. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 206) to the website, and illustrates the visited pages and in order in which the pages were visited. The client viewing the journey interface on the member client device 202 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 312 is responsible for generating the merchandising interface to be displayed by the member client device 202 via the experience analytics client 204. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 314 is responsible for creating accessible digital experiences for the client's website to be displayed by the customer client devices 206 for users that would benefit from an accessibility-enhanced version of the client's website. For instance, the adaptability system 314 can improve the digital experience for users with disabilities, such as visual impairments, cognitive disorders, dyslexia, and age-related needs. The adaptability system 314 can, with proper user permissions, analyze the data from the experience analytics script 222 to determine whether an accessibility-enhanced version of the client's website is needed, and can generate the accessibility-enhanced version of the client's website to be displayed by the customer client device 106.

The insights system 316 is responsible for analyzing the data from the data management system 302 and the data analysis system 304 surface insights that include opportunities as well as issues that are related to the client's website. The insights can also include alerts that notify the client of deviations from a client's normal business metrics. The insights can be displayed by the member client devices 202 via the experience analytics client 204 on a dashboard of a user interface, as a pop-up element, as a separate panel, etc. In this example, the insights system 316 is responsible for generating an insights interface to be displayed by the member client device 102 via the experience analytics client 204. In another example, the insights can be incorporated in another interface such as the zoning interface, the session replay, the journey interface, or the merchandising interface to be displayed by the member client device 202.

The errors system 318 is responsible for analyzing the data from the data management system 302 and the data analysis system 304 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 206 visiting the client's website). The errors can also include causes of looping behaviors by the users, in-page issues such as unresponsive calls to action and slow loading pages, etc. The errors can be displayed by the member client devices 202 via the experience analytics client 204 on a dashboard of a user interface, as a pop-up element, as a separate panel, etc. In this example, the errors system 318 is responsible for generating an errors interface to be displayed by the member client device 202 via the experience analytics client 204. In another example, the insights can be incorporated in another interface such as the zoning interface, the session replay, the journey interface, or the merchandising interface to be displayed by the member client device 202.

The application conversion system 320 is responsible for the conversion of the functionalities of the experience analytics server 216 as provided to a client's website to a client's native mobile applications. For instance, the application conversion system 320 generates the mobile application version of the zoning interface, the session replay, the journey interface, the merchandising interface, the insights interface, and the errors interface to be displayed by the member client device 202 via the experience analytics client 104. The application conversion system 320 generates an accessibility-enhanced version of the client's mobile application to be displayed by the customer client devices 206.

Data Architecture

Figure 4:
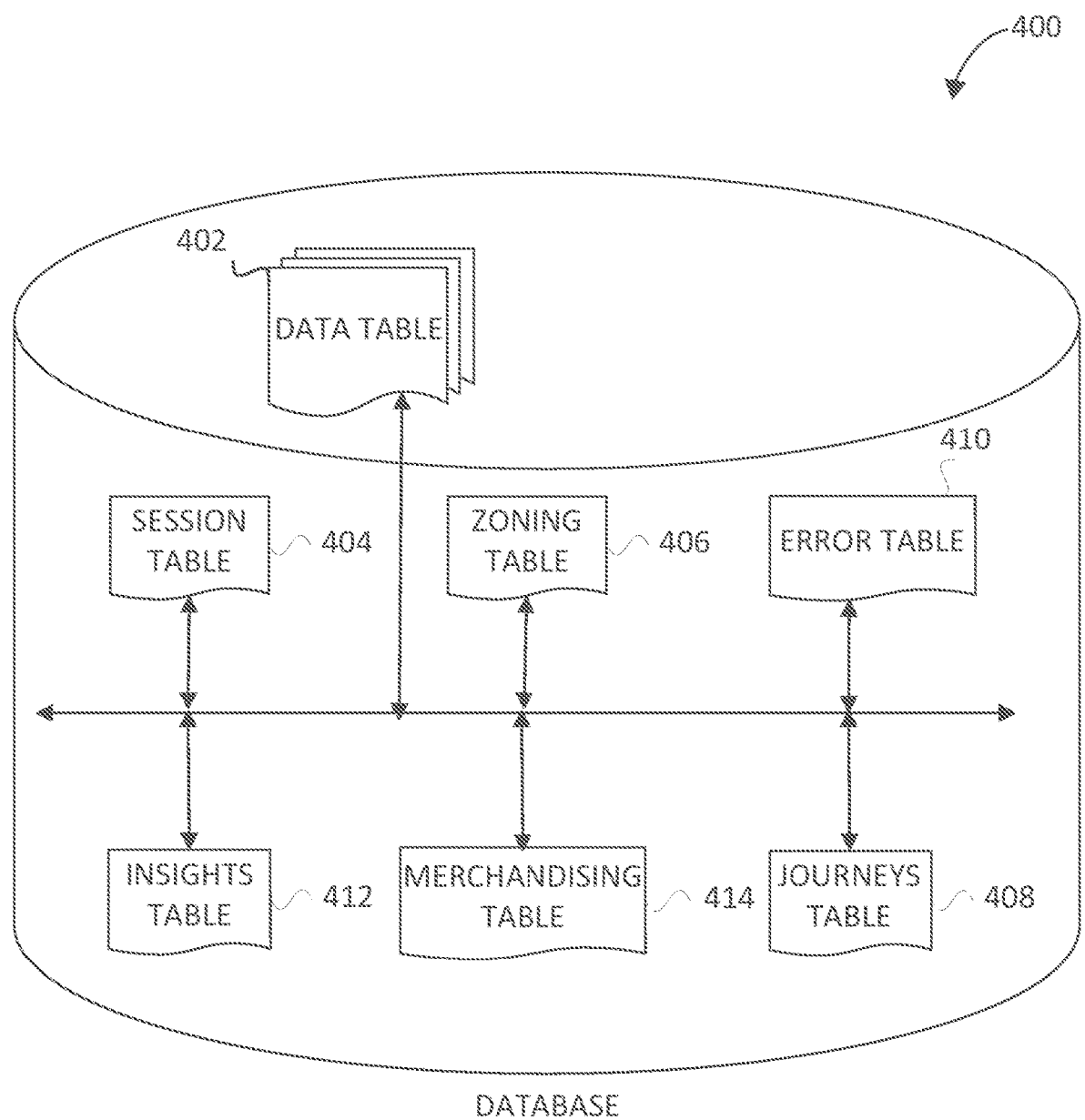
FIG. 4 is a diagrammatic representation of a data structure as maintained in a database, in accordance with some examples.

FIG. 4 is a schematic diagram illustrating database 400, which may be stored in the database 400 of the experience analytics server 216, according to certain examples. While the content of the database 400 is shown to comprise a number of tables, it will be appreciated that the data could be stored in other types of data structures (e.g., as an object-oriented database).

The database 400 includes a data table 402, a session table 404, a zoning table 306, an error table 410, an insights table 412, a merchandising table 414, and a journeys table 408.

The data table 402 stores data regarding the websites and native applications associated with the clients of the experience analytics system 200. The data table 42 can store information on the contents of the website or the native application, the changes in the interface of the website being displayed on the customer client device 206, the elements on the website being displayed or visible on the interface of the customer client device 206, the text inputs by the user into the website, a movement of a mouse (or touchpad or touch screen) cursor and mouse (or touchpad or touch screen) clicks on the interface of the website, etc. The data table 402 can also store data tags and results of data science and data engineering processes on the data. The data table 402 can also store information such as the font, the images, the videos, the native scripts in the website or applications, etc.

The session table 404 stores session replays for each of the client's websites and native applications.

The zoning table 406 stores data related to the zoning for each of the client's websites and native applications including the zones to be created and the zoning overlay associated with the websites and native applications.

The journeys table 408 stores data related to the journey of each visitor to the client's website or through the native application.

The error table 410 stores data related to the errors generated by the errors system 318 and the insights table 412 stores data related to the insights generated by the insights table 412.

The merchandising table 414 stores data associated with the merchandising system 312. For example, the data in the merchandising table 414 can include the product catalog for each of the clients, information on the competitors of each of the clients, the data associated with the products on the websites and applications, the analytics on the product opportunities and the performance of the products based on the zones in the website or application, etc.

Figure 5:
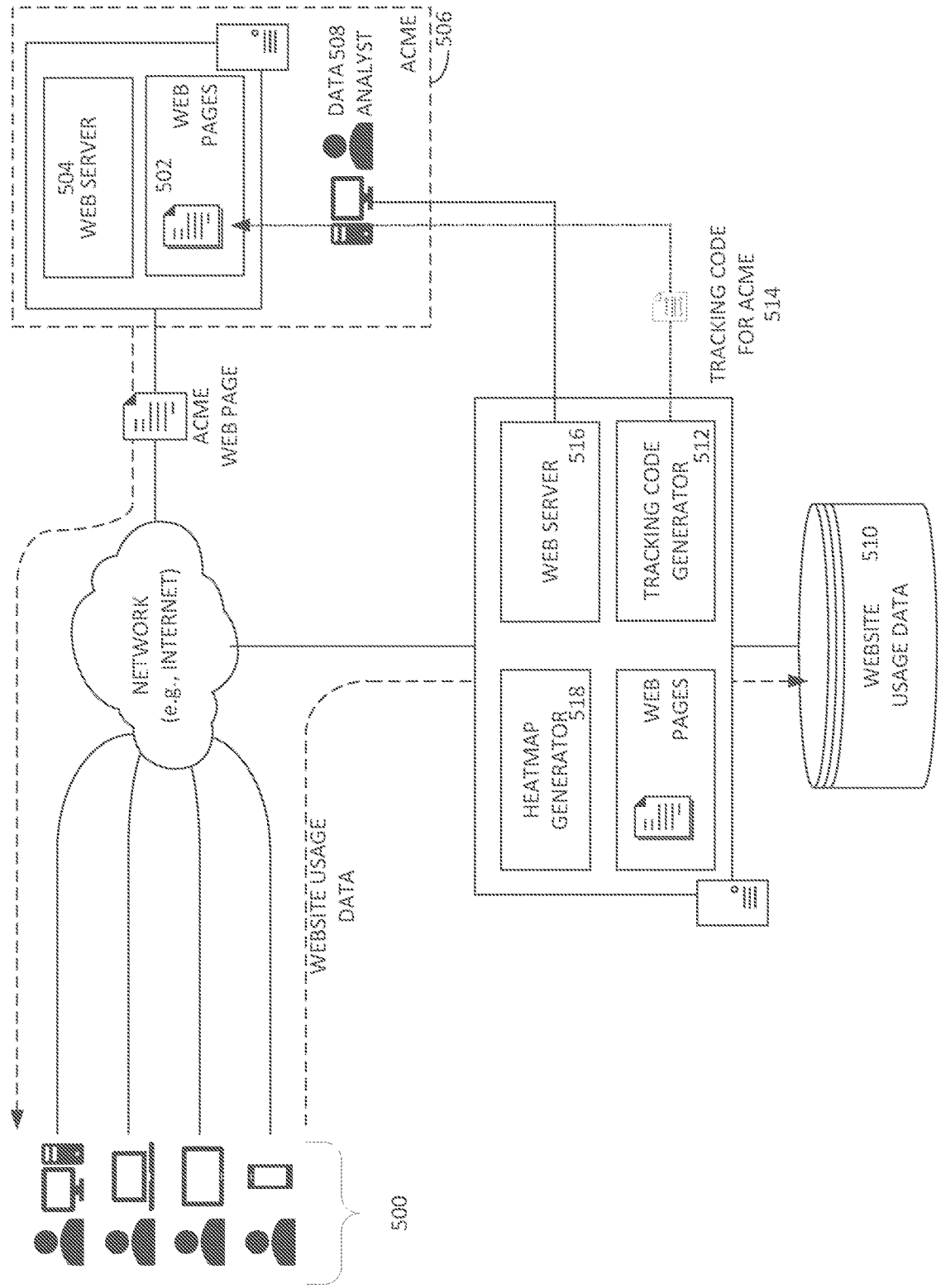
FIG. 5 is a diagrammatic representation of a networked computer environment illustrating a high-level view of the individual computing devices with which a data analytics service may be integrated and deployed, consistent with embodiments.

FIG. 5 is an alternative view of a networked computing environment illustrating a high-level view of the individual computing devices with which a data analytics service may be integrated and deployed, consistent with embodiments of the invention. A shown in FIG. 5, end-users 500 use web browser applications executing on any of a number of different types of computing devices (e.g., desktop, laptop, tablet, and mobile) to invoke requests for web pages 502 that are served by the web server 504 operated by the ACME 506 enterprise. Before the various end-user interactions can be detected and logged as website usage data 510, a representative (e.g., a data analyst 508) of ACME adds tracking code to the source documents that represent the various web pages 502 served by ACME's web server 504. Accordingly, the data analytics service may have and provide a tracking code generator 512 that, via a web-based interface, prompts for specific information about a customer (e.g., ACME 506) and generates the necessary tracking code 514 for use by each individual customer of the data analytics service. With some embodiments, the tracking code is a client-side script (e.g., JavaScript), which, when executed at a web browser application of an end-user 500, causes the web browser application to detect interactions with a web page, and then communicate information (e.g., website usage data) to the data analytics service. By way of example, the interactions that may be detected include clicks, taps, mouse movements, and scrolling. Here, a click occurs when an end-user uses a mouse or other cursor-control device to make a selection of a web page element (e.g., a link, a button, or any of a wide variety of other user interface elements). When the web browser application is executing on a computing device with a touch screen display, the equivalent of a click is referred to as a tap. In addition to clicks and taps, the website usage data 510 that is collected may also include mouse movements and web page scrolling. As the website usage data 510 is received by the data analytics service, the website usage data is stored for subsequent recall. In addition to specifying the type of interaction that was detected at the web browser application, the website usage data also includes a timestamp to indicate when the interaction occurred, and in some instances, information relating to the device type (e.g., desktop/laptop, tablet, mobile, etc.).

Consistent with some embodiments, website usage data 510 may be captured for a subset of end-user sessions. For instance, with some embodiments, website usage data is not obtained for every end-user's website session, but instead, a sampling algorithm may be implemented to ensure that a sufficient amount of website usage data is obtained over a given period of time. For instance, it may be advantageous to selectively collect website usage data at different times of the day, and/or different days of the week, and so on, as to ensure that certain types of bias are not inadvertently introduced into the website usage data, by virtue of when the website usage data is obtained.

Once website usage data 510 for the ACME website has been obtained and stored at the data analytics service, a representative of ACME (e.g., data analyst 508) can interact with the web server 516 of the data analytics service to request that a heatmap be generated and presented with a live view of the ACME website. As described in greater detail below, as the data analyst is viewing a dynamic heatmap with the live view of the ACME website, when the data analyst navigates from one web page to another, the heatmap is dynamically updated to reflect end-user 500 behavior for the relevant and visible web page and web page elements. In general, the dynamic updating of the heatmap is achieved by executing a client-side script (e.g., JavaScript) that identifies changes that occur to the target website as a result of interactions with the analytics web page and/or the target web page, by the data analyst. These detected changes trigger a request that is communicated from the web browser application to the web server 516 of the data analytics service for additional website usage data 510. In some instances, the web server 516 may interact with the heatmap generator 518, which obtains the relevant website usage data to correspond with any parameters specified in the received request. The selected website usage data is then communicated to the web browser application of the data analyst 508, where a new heatmap overlay is generated and presented, based on the newly received website usage data. That is, the heatmap overlay is generated to correspond with the newly received website usage data.

Figure 6:
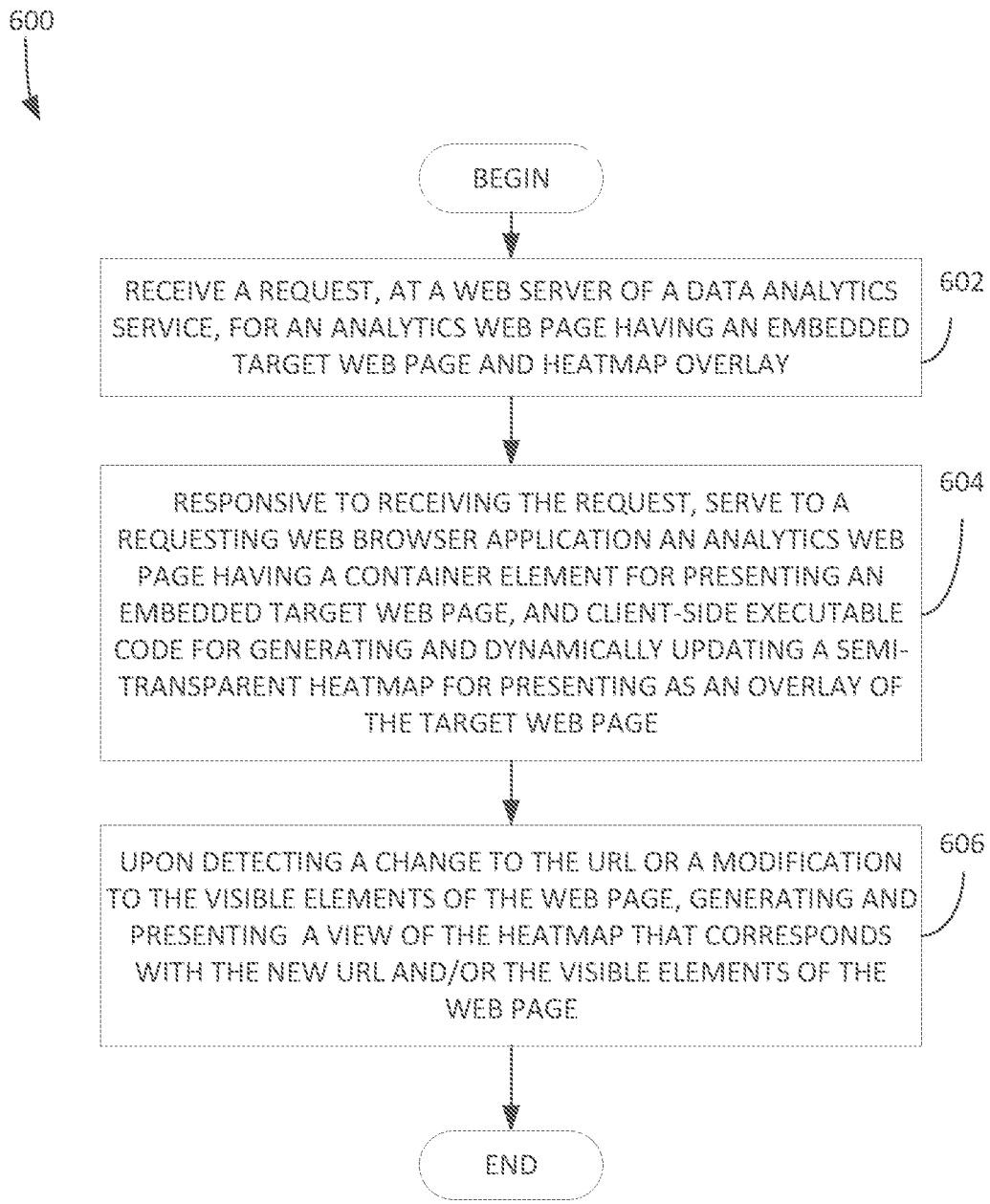
FIG. 6 is a flow diagram illustrating an example of the method operations that are performed to present a dynamic heatmap over a live view of a web page of a website, consistent with embodiments of the invention.

FIG. 6 is a flow diagram illustrating an example of the method operations that may be performed to present a dynamic heatmap over a lie view of a web page of a website, consistent with embodiments of the invention. For purposes of the example being presented and described in connection with FIG. 6, one should presume that the website usage data has already been obtained and stored by the data analytics service. Accordingly, the technique being described with respect to FIG. 6 involves the generating and the presenting of the dynamic heatmap, which is derived based on the website usage data that has already been obtained. The method 600 begins when, at method operation 602, a data analyst, using a web browser application, invokes a request to view a web page hosted by the web server of the data analytics service. The web page—referred to herein as an analytics web page—is coded using a combination of HTML and CSS styling, and includes an HTML container object via which a target web page is to be embedded. Here, the target web page is the web page over which the heatmap is to be presented. As a result of the data analyst specifying the URL of the analytics web page via a web browser application, the web browser application of the data analyst communicates a request for the analytics web page to the web server of the data analytics service.

At method operation 604, in response to receiving the request, the web server of the data analytics web page is served to the requesting web browser application. The source document, representing the analytics web page, is processed by the web browser application to render the analytics web page. As described in greater detail below, the analytics web page includes a user interface element, referred to herein as a widget, that enables the data analyst to specify the URL of a target web page over which a heatmap is to be overlayed. Accordingly, when the data analyst specifies a URL for the target web page, the web browser application retrieves the source document for the target web page, which is then presented as an embedded web page within the data analytics web page. For instance, the analytics web page presents the target web page, embedded as a container within the analytics web page. The analytics web page uses HTML and CSS styling to generate a container for the target web page, such that the target web page is presented embedded within the analytic web page, with top, left and right margins. With some embodiments, one or more filtering widgets are presented within these margins, where the filtering widgets provide mechanisms by which various settings can be established for controlling aspects of how the semi-transparent heatmap is generated and presented. By way of example, consider the illustration presented in FIG. 7.

Figure 7:
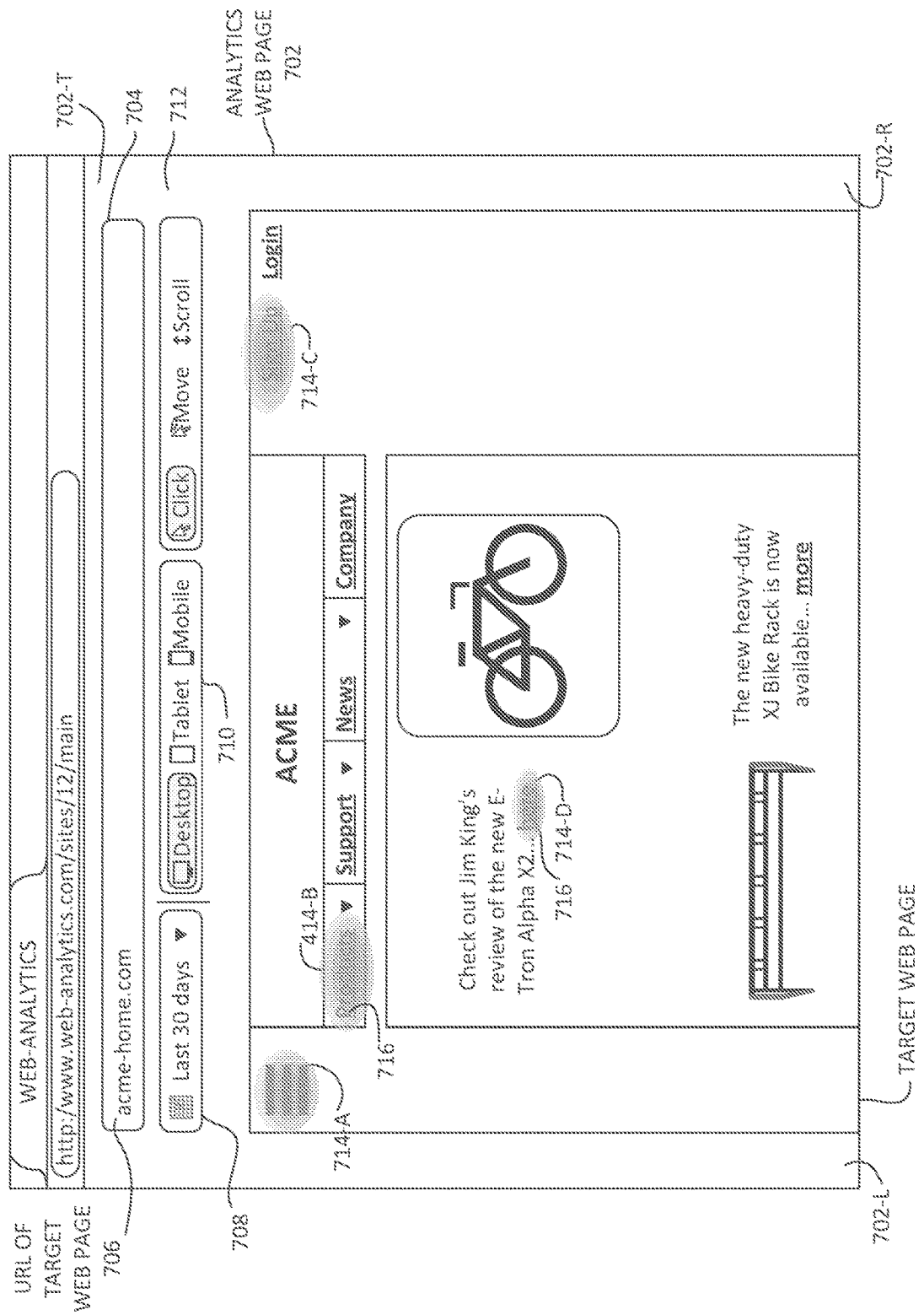
FIG. 7 is a user interface diagram illustrating an example of a dynamic heatmap overlayed on a live view of a webpage having dynamic controls, consistent with embodiments of the invention.

As shown in FIG. 7, the embedded or target web page 700, is shown bounded by top 702-T, left 702-L and right margins 702-R of the analytics web page 702. In the top margin 702-T, a first widget 704 provides an input element via which the data analyst can specify a URL 706 for the target web page 700. Accordingly, as shown in FIG. 7, the URL 706 of the target web page 700 is shown as "acme-home.com." A second widget 708 provides an input element by which the data analyst can specify a time period over which the website usage data was collected. For instance, with some embodiments, the data analyst may be prompted to select a predetermined previous number of days—for example, the last 5, 10, 15, or 30 days. Alternatively, with some embodiments, the data analyst may be prompted to select a predetermined previous number of weeks, or months, or specify a beginning and ending date for a custom time duration. A third widget 710 provides an input element via which the data analyst can select a device type or web page version that corresponds with the website usage data. For example, the data analyst may select to view a dynamic heatmap overlaying a desktop version, a tablet version, or a mobile device version of the target website. By selecting one device type, the dynamic heatmap is generated using website usage data that corresponds with the type of device from which the website usage data was collected. By presenting a different heatmap, where each heatmap is based on website usage data corresponding with a different version of a web page, the data analytics service allows the data analyst to gain an understanding of how end-users are interacting with different versions of the web pages of the website. Finally, a fourth widget 712 provides the data analyst with an input element for selecting the type of website usage data to be used to create the dynamic heatmap—specifically, clicks and taps, mouse movements, or scrolling).

As the data analyst interacts with input elements or widgets (e.g., 706, 708, 710 and 712) a request, with filtering parameters that correspond with the inputs specified via the relevant widgets, is generated, and communicated to the web server of the data analytics service. The request is processed (e.g., by the server-side heatmap generator) to select the relevant website usage data that corresponds with the filtering parameters. By way of example, if the widgets (708, 710 and 712) indicate that a click heatmap is to be generated for the desktop version of the target web page, with website usage data from the last 30 days, the heatmap generator will process the request to generate a response with the relevant data. The heatmap data is then communicated to the web browser application, where client-side code is used to generate a heatmap overlay based on the received heatmap data. As illustrated in FIG. 7, the click heatmap is represented by the heatmap blobs 714-A, 714-B, 714-C and 714-D. The heatmap is generated as an HTML canvas, and positioned at the maximum z-index value, so that the heatmap is presented above any other elements of the web page.

Consistent with some embodiments, when the server-side heatmap generator receives a request with associated filtering parameters, the heatmap generated will query a database to obtain the relevant website usage data. For example, the heatmap generator may request website usage data for a specific URL, for specified time period, for a specific version of a web page (e.g., desktop, tablet, mobile, etc.), and for a particular type of usage data (e.g., clicks, mouse movement, or scrolling). The relevant data is then analyzed to compute for a specific web page heatmap data that corresponds with all elements of the web page, even if some of the elements may not be visible, as the web page is being presented at that time. Accordingly, at least with some embodiments, the heat intensity metric may be calculated relative to all elements (visible and invisible), and as such, the heat intensity for any one web page element will be derived relative to the heat intensity of the more frequently interacted with web page element. As described in greater detail below, although the heatmap data may be generated for all web page elements, the client-side code generates the heatmap to reflect heat only for visible web page elements, and dynamically updates the presentation of the heatmap as interaction with the target web page causes some new elements to become visible, and others invisible.

Referring again to FIG. 6, at method operation 604, with some embodiments, when the web browser application initially processes the source document for the analytics web page 702, a client-side script causes an application programming interface (API) request to be communicated to the web server of the data analytics service, where the request specifies one or more of the filtering parameters established via the widgets. The request, and the filtering parameters, are processed by the heatmap generator. With some embodiments, the heatmap generator converts the relevant website usage data (e.g., number of clicks in a specified time period) attributed or associated with a web page element to absolute coordinates corresponding with the web page element. This data—e.g., the count of clicks, and coordinates for a web page element is then communicated to the client-side code, which processes the heatmap data to generate a canvas that is put in the highest z-index, positioned absolutely so that the position of the heatmap blobs correspond with the coordinates of the relevant web page elements.

Referring now to method operation 606 of FIG. 6, in contrast with conventional heatmap tools that present a heatmap as an overlay of a static image of a web page, the target web page 700 as shown in FIG. 7 is a live view of the web page, such that the interactive elements of the web page can be selected by the data analyst. By way of example, if the data analyst selects the link ("here") 716 shown with the heatmap blob 714-D, the web browser application will detect the selection and generate a request to obtain and display the source document referenced by the link. As the web browser obtains the new target web page, the client-side code of the analytics web page will detect a change in the URL of the target web page, and will make a request to the data analytics service to obtain new website usage data (e.g., new heatmap data). When the heatmap data is communicated to the web browser application, a heatmap generator executing at the client-side will generate and present the new heatmap to correspond with the new target web page.

In addition to dynamically generating a heatmap to correspond with new web pages that are presented as a result of a data analyst navigating a website, with some embodiments, changes in the presentation of a web page that result from interactions with dynamic or interactive web page elements also result in updates to the heatmap. By way of example, consider the web page element 716 in FIG. 7. The button, with label "Products" is an interactive web page element, which when selected by an end-user, causes a drop-down menu to be presented. Accordingly, if a data analyst is interested in viewing the drop-down menu, the data analyst need only select the web page element 716.

Figure 8:
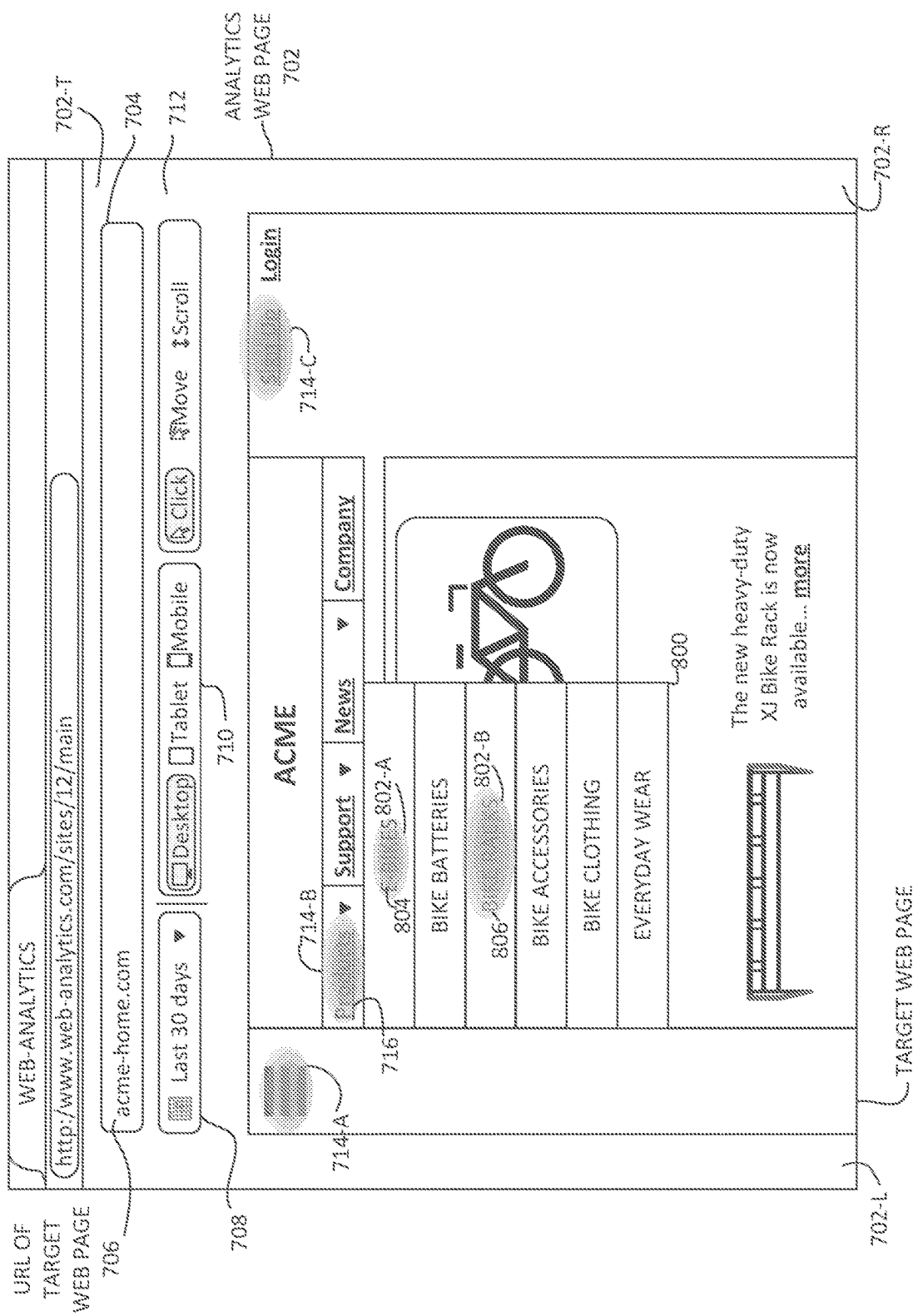
FIG. 8 is a user interface diagram illustrating an example of how a heatmap overlayed on a live view of a webpage is dynamically updated as the content of the webpage changes, consistent with embodiments of the invention.

As shown in FIG. 8, when the data analyst selects the web page element 716 (e.g., the "Products" button), a drop-down menu 800 is presented in the target web page 700. The change to presentation of the web page is detected by client-side code (e.g., a mutation observer). As a result, a request is directed to the data analytics service for new website usage data (e.g., heatmap data), which, when received and processed at the client-side, results in the dynamic update of the heatmap. Specifically, as shown in FIG. 8, the heatmap blobs 802-A and 802-B that correspond with the web page elements 804 (e.g., the button with label. "E-BIKES") and 806 (e.g., the button with label. "BIKE RACKS") are included in the new heatmap, whereas the heatmap blob 714 (shown in FIG. 7) is removed from the new heatmap, because the web page element 716 with which the heatmap blob 714 is associated is no longer visible, as a result of the presentation of the drop-down menu 800.

With some embodiments, a mutation observer (e.g., a client-side script) is used to detect the changes that are made to the web page as a result of the data analyst interacting with dynamic or interactive web page elements. When changes are detected, these events trigger an operation to redraw the heatmap, by removing portions of the heatmap that correspond with invisible web page elements, and adding portions of the heatmap over the newly visible web page elements, thereby keeping the presentation of the heat accurate. Tis approach also covers situations where there is a marquee-style carousel that automatically keeps looping, as may be the case when showing customer logos on a home page. To avoid updating or redrawing the heatmap too frequently, debouncing and throttling are used to optimize the performance. Debouncing and throttling are two different, but related, techniques to control how many times a function or operation is allowed to be executed over a period of time.

Figure 9:
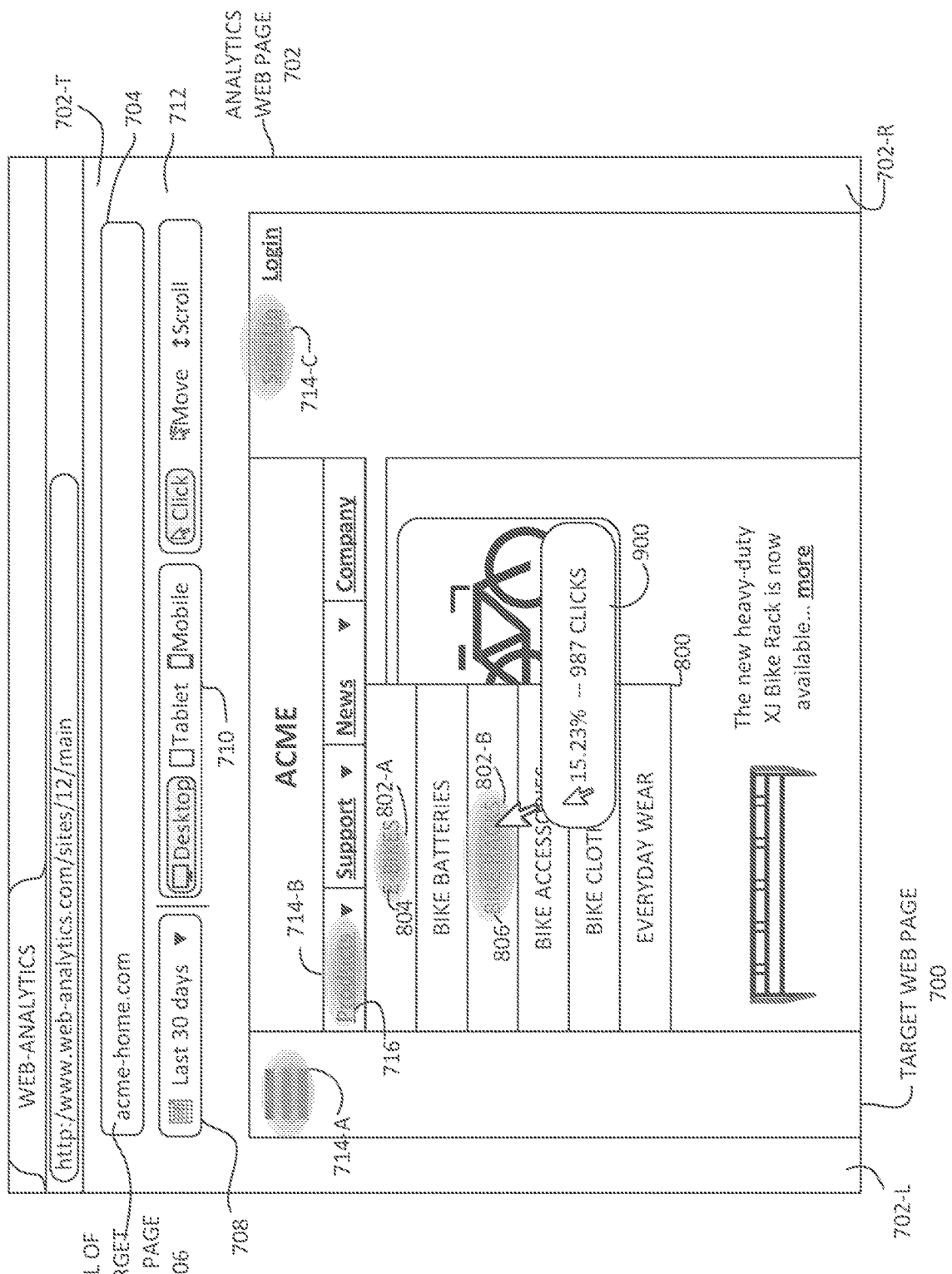
FIG. 9 is a user interface diagram illustrating an example of a user interface element that can be selectively controlled to display raw data from which a portion of a heatmap (e.g., a heatmap blob) was generated, consistent with embodiments of the present invention.

FIG. 9 is a user interface diagram illustrating an example of a user interface element 900 that can be selectively controlled to display raw data from which a portion of a heatmap (e.g., a heatmap blob) was generated, consistent with embodiments of the present invention. As illustrated in FIG. 9, with some embodiments, a data analyst may invoke an operation causing the presentation of data from relating to a particular heatmap blob. For instance, with some embodiments, when a data analyst hovers over a heatmap blob with the mouse-controlled cursor, a dialog or text box 900 may be presented with data relating to the heatmap blob. By way of example, the text box 900 shows that the heatmap blob 802-B that corresponds with the web page element 806 was clicked by end-users "987" times over the prior 30 days. With some embodiments, the additional data (e.g., as shown in text box 900) may be presented for all heatmap blobs, in response to a keyboard shortcut. For example, if a data analyst presses a specific key on the keyboard, a dialog or text box may be presented in connection with multiple heatmap blobs that are part of the visible heatmap In other instances, the data analyst may be required to perform a specific mouse-based gesture, e.g, an alt-click or right-click.

Some of the embodiments of the invention, as described above and presented herein, involve presenting a target web page, embedded within an analytics web page, for example, using an HTML container. With other embodiments, a special link to a target web page is created, such that, when an end-user invokes the link, the target web page is requested and the URL used to request the target web page is specified with one or more URL query parameters. The web server hosting the target web page processes the request by sending the relevant web page to the requesting web browser application. Then, client-side code (e.g., the tracking code)—typically implemented with JavaScript—obtains the URL query parameters, and in response, uses the parameters to make a request to the data analytics service for heatmap data for the web page that is being rendered. When the heatmap data is communicated back to the web browser application, from the data analytics service, the client-side code uses the heatmap data to generates a heatmap as a canvas that is positioned in the maximum Z-index.

Figure 10:
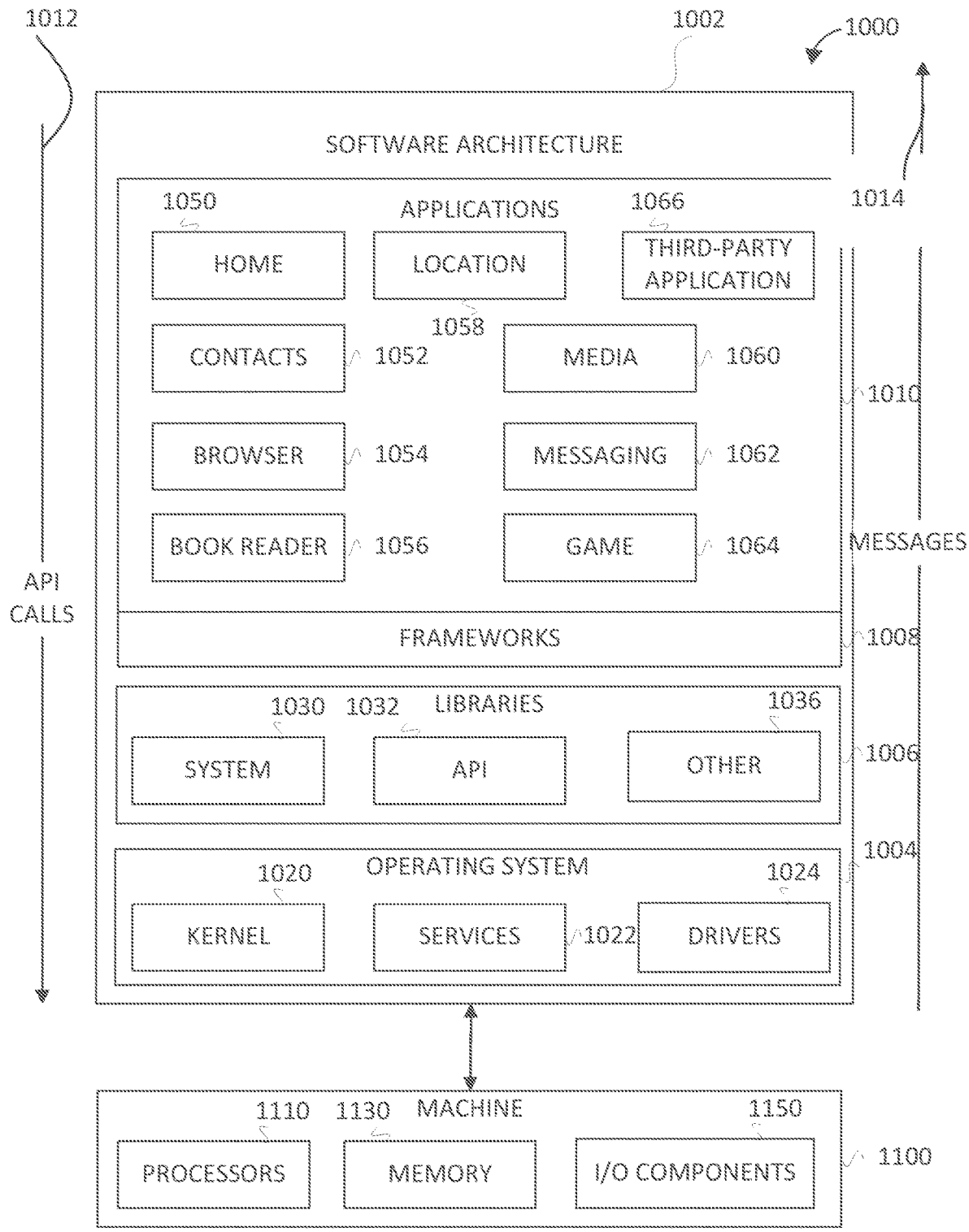
FIG. 10 is a block diagram illustrating a software architecture, which can be installed on any of a variety of computing devices to perform methods consistent with those described herein.

FIG. 10 is a block diagram 1000 illustrating a software architecture 1002, which can be installed on any of a variety of computing devices to perform methods consistent with those described herein. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of lavers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various GUI functions, high-level resource management, high-level location services, and so forth. The frameworks 1008 can provide a broad spectrum of other APIs that can be utilized by the applications 1010, some of which may be specific to a particular operating system 1094 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone. or another mobile operating system. In this example, the third-party application 1066 can invoke the API calls 1012 provided by the operating system 804 to facilitate functionality described herein.

Figure 11:
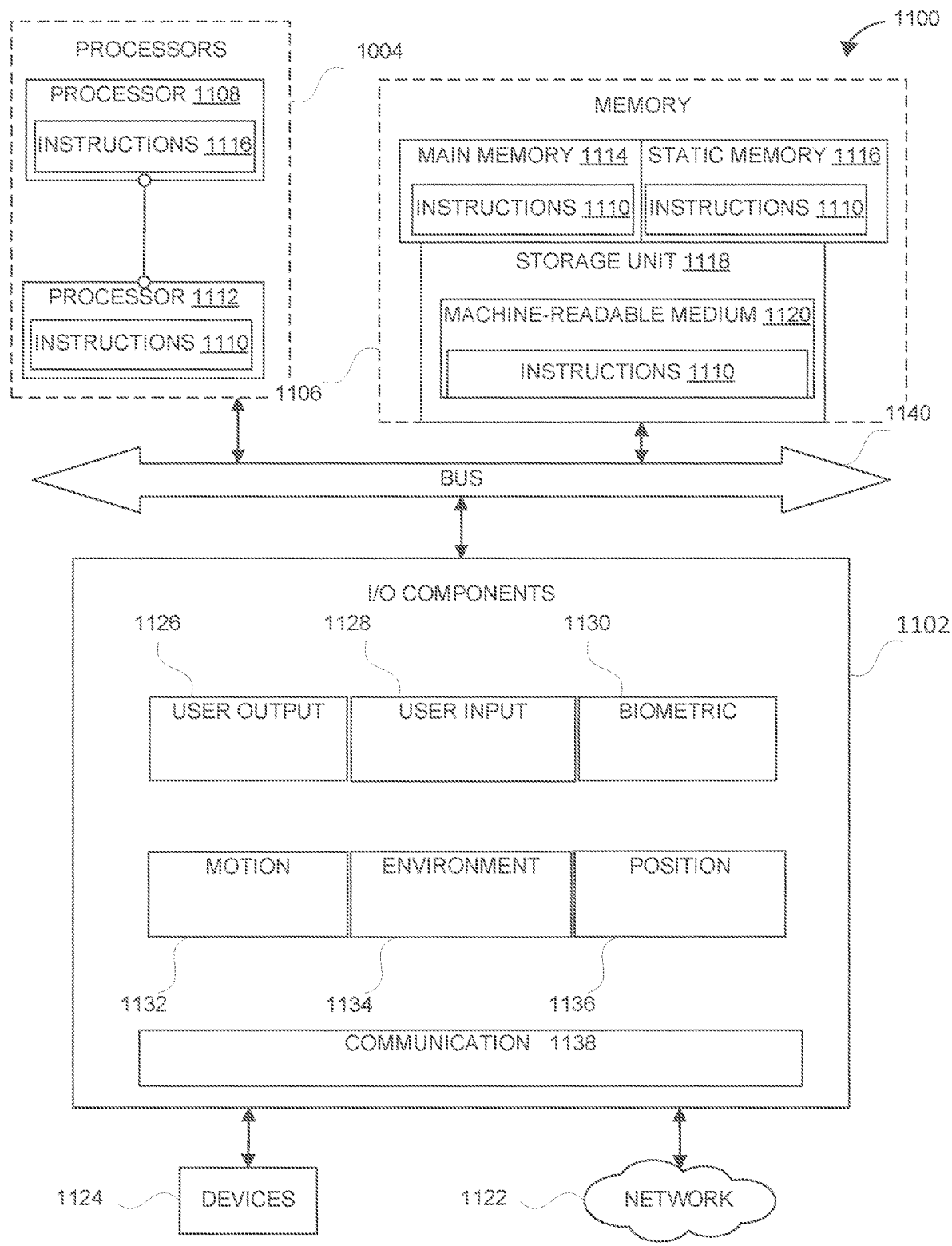
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute any one of the methods or algorithms described herein. Additionally, or alternatively, the instructions 1116 may implement a system or model as described in connection with FIGS. 3 and 5, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, all accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth.

The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions (e.g., the instructions 1116), when executed by processor(s) 1110, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by was of example semiconductor memory devices. e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media." "computer-storage media." and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 980 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer implemented method comprising:
   generating a special link to a first target web page, wherein the special link specifies one or more URL query parameters;
   responsive to receiving a request from a client computer of a user that invokes the special link, communicating the first target web page to a web browser application at the client computer, wherein a URL used to request the first target web page includes the one or more URL query parameters;
   wherein a client-side script executing at the web browser application of the client computer of the user obtains the one or more URL query parameters and, in response, communicates a request to a server for previously obtained click data associated with the first target web page, the request including the one or more URL query parameters;
   receiving the previously obtained click data associated with the first target web page at the client computer of the user;
   generating, by the client-side script executing at the web browser application of the client computer of the user, a semi-transparent click heatmap overlay for the first target web page based on the received previously obtained click data; and
   presenting the first target web page at the web browser application with the semi-transparent click heatmap overlay.

2. The computer implemented method of claim 1, wherein the client-side script executing at the web browser application detects a user selection of a web page element presented in the first target web page that causes a second target web page to be displayed at the web browser application, and wherein the client-side script, in response, communicates a request to the server for previously obtained click data associated with the second target web page.

3. The computer implemented method of claim 1, wherein the client-side script, when executed at the web browser application, performs operations comprising:
   detecting an interaction with a first element of the first target web page that causes a second element of the first target web page to become visible and a third element of the first target web page to become invisible; and
   automatically updating the presentation of the semi-transparent heatmap by generating an updated semi-transparent heatmap with a heatmap blob positioned over the second element and excluding a heatmap blob over the third element.

4. The computer implemented method of claim 3, wherein the first element of the first target web page and the second element of the first target web page are interactive web page elements associated with one of:
   an expandable or drop-down menu;
   a modal;
   a pop-up window;
   a content carousel; or
   a slideshow presentation.

5. The computer implemented method of claim 1, wherein the client-side script, when executed at the web browser application, performs operations comprising:
   presenting with the first target web page a filtering widget via which a time period can be specified, wherein generating the semi-transparent click heatmap includes generating the semi-transparent heatmap with click data obtained during a time period consistent with the time period specified via the filtering widget.

6. The computer implemented method of claim 1, wherein the client-side script, when processed by the web browser application, causes the web browser application to perform operations comprising:
   presenting with the first web page a first filtering widget via which a time period can be selected, wherein generating the semi-transparent click heatmap includes generating the semi-transparent heatmap with click data obtained during a time period consistent with the time period specified via the first filtering widget.

7. The computer implemented method of claim 1, wherein the client-side script, when executed at the web browser application, performs operations comprising:
   responsive to detecting an input, presenting a web page element in proximity to a heat blob of the semi-transparent heatmap, the web page element presenting raw click data from which the heatmap blob was generated.

8. A system comprising:
   one or more processors for executing instructions; and
   one or more memory storage devices storing instructions thereon, which, when executed by the one or more processors, causes the system to perform operations comprising:
   generating a special link to a first target web page, wherein the special link specifies one or more URL query parameters;
   responsive to receiving a request from a client computer of a user that invokes the special link, communicating the first target web page to a web browser application at the client computer of the user, wherein a URL used to request the first target web page includes the one or more URL query parameters;
   wherein a client-side script executing at the web browser application of the client computer of the user obtains the one or more URL query parameters and, in response, communicates a request to a server for previously obtained click data associated with the first target web page, the request including the one or more URL query parameters;
   receiving the previously obtained click data associated with the first target web page at the client computer of the user;
   generating, by the client-side script executing at the web browser application of the client computer of the user, a semi-transparent click heatmap overlay for the first target web page based on the received previously obtained click data; and
   presenting the first target web page at the web browser application with the semi-transparent click heatmap overlay.

9. The system of claim 8, wherein the client-side script executing at the web browser application detects a user selection of a web page element presented in the first target web page that causes a second target web page to be displayed at the web browser application, and wherein the client-side script, in response, communicates a request to the server for previously obtained click data associated with the second target web page.

10. The system of claim 8, wherein the client-side script, when executed at the web browser application, performs operations comprising:

detecting an interaction with a first element of the first target web page that causes a second element of the first target web page to become visible and a third element of the first target web page to become invisible; and automatically updating the presentation of the semi-transparent heatmap by generating an updated semi-transparent heatmap with a heatmap blob positioned over the second element and excluding a heatmap blob over the third element.

11. The system of claim 10, wherein the first element of the first target web page and the second element of the first target web page are interactive web page elements associated with one of:

an expandable or drop-down menu;
a modal;
a pop-up window;
a content carousel; or
a slideshow presentation.

12. The system of claim 8, wherein the client-side script, when executed at the web browser application, performs operations comprising:

presenting with the first target web page a filtering widget via which a time period can be specified, wherein generating the semi-transparent click heatmap includes generating the semi-transparent heatmap with click data obtained during a time period consistent with the time period specified via the filtering widget.

13. The system of claim 8, wherein the client-side script, when executed at the web browser application, performs operations comprising:

presenting with the first target web page a filtering widget via which a time period can be selected, wherein generating the semi-transparent click heatmap includes generating the semi-transparent heatmap with click data obtained during a time period consistent with the time period specified via the filtering widget.

14. The system of claim 8, wherein the client-side script, when executed at the web browser application, performs operations comprising:

responsive to detecting an input, presenting a web page element in proximity to a heat blob of the semi-transparent heatmap, the web page element presenting raw click data from which the heatmap blob was generated.

15. A system comprising:

means for generating a special link to a first target web page, wherein the special link specifies one or more URL query parameters;

means for communicating the first target web page to a web browser application, responsive to receiving a request that invokes the special link, wherein a URL used to request the first target web page includes the one or more URL query parameters;

means for obtaining, by a client-side script executing at the web browser application, the one or more URL query parameters and, in response, communicating a request to a server for previously obtained click data associated with the first target web page, the request including the one or more URL query parameters;

means for receiving the previously obtained click data associated with the first target web page;

means for generating, using a client-side script executing at the web browser application, a semi-transparent click heatmap overlay for the first target web page based on the received previously obtained click data; and means for presenting the first target web page at the web browser application with the semi-transparent click heatmap overlay.

16. The system of claim 15, wherein the client-side script executing at the web browser application detects a user selection of a web page element presented in the first target web page that causes a second target web page to be displayed at the web browser application, and wherein the client-side script, in response, communicates a request to the server for previously obtained click data associated with the second target web page.

17. The system of claim 15, further comprising:

means for detecting an interaction with a first element of the first target web page that causes a second element of the first target web page to become visible and a third element of the first target web page to become invisible; and means for automatically updating the presentation of the semi-transparent heatmap by generating an updated semi-transparent heatmap with a heatmap blob positioned over the second element and excluding a heatmap blob over the third element.

18. The system of claim 17, wherein the first element of the first target web page and the second element of the first target web page are interactive web page elements associated with one of:

an expandable or drop-down menu;
a modal;
a pop-up window;
a content carousel; or
a slideshow presentation.

19. The system of claim 15, further comprising:

means for presenting with the first target web page a filtering widget via which a time period can be specified, wherein generating the semi-transparent click heatmap includes generating the semi-transparent heatmap with click data obtained during a time period consistent with the time period specified via the filtering widget.

20. The system of claim 15, further comprising:

means for presenting with the first target web page a filtering widget via which a time period can be selected, wherein generating the semi-transparent click heatmap includes generating the semi-transparent heatmap with click data obtained during a time period consistent with the time period specified via the filtering widget.

* * * * *